United States Patent [19]

Owens

[11] Patent Number: 5,119,468
[45] Date of Patent: Jun. 2, 1992

[54] APPARATUS AND METHOD FOR CONTROLLING A PROCESS USING A TRAINED PARALLEL DISTRIBUTED PROCESSING NETWORK

[75] Inventor: Aaron J. Owens, Newark, Del.

[73] Assignee: E. I. Du Pont de Nemours and Company, Wilmington, Del.

[21] Appl. No.: 660,915

[22] Filed: Feb. 27, 1991

Related U.S. Application Data

[63] Continuation of Ser. No. 563,735, Aug. 3, 1990, abandoned, which is a continuation of Ser. No. 316,717, Feb. 28, 1989, abandoned.

[51] Int. Cl.$^5$ .................................... G06F 15/18
[52] U.S. Cl. .................... 395/22; 364/151; 364/165
[58] Field of Search .......... 364/149, 150, 151, 164, 364/165, 513

[56] References Cited

U.S. PATENT DOCUMENTS

| | | | |
|---|---|---|---|
| 3,221,151 | 11/1965 | Cattel et al. | 364/151 |
| 4,195,337 | 3/1980 | Bertrand et al. | 364/151 |
| 4,349,869 | 9/1982 | Prett et al. | 364/159 |
| 4,578,747 | 3/1986 | Hideg et al. | 364/151 |
| 4,752,906 | 6/1988 | Kleinfeld | 364/513 |

OTHER PUBLICATIONS

Tolat and Widrow, "An Adaptive 'Broom Balancer' with Visual Inputs", Jul. 24-27, 1988, II-641-II-647, IEEE Intnl Conf.
Nguyen and Widrow, "The Truck Backer-Upper: An Example of Self-Learning in Neural Networks", Jun. 18-22, 1989, II-357-II-363, vol. II.
Kolliaws and Anastassiou, "Adaptive Training of Multilayer Neural Networks Using a Least Squares Estimation Technique", pp. I-383-I-390.
Rumelhart, Hinton and Williams, "Learning Internal Representations by Error Propagation", Chapter 8, pp. 318-362.
Ronald J. Williams, "Inverting a Connectionist Network Mapping by Back-Propagation of Errors", Inst. for Cognitive Science, Univ. of California, San Diego, pp. 859-865.
Widrow, "The Original Adaptive Neural Net Broom-Balancer", Department of Electrical Engineering, Stanford Univ., pp. 3/9-9/9.

Primary Examiner—Allen R. MacDonald

[57] ABSTRACT

A parallel distributed processing network, previously trained to simulate a process, is responsive to input activations A to produce outputs Y. The activations are representative of the input parameters P of the process and the outputs are representative of the characteristics C of the product of the process. A set of goal signals G corresponding to the desired physical characteristics D of the product are produced and used to generate a signal representative of the error E between the goal signals G and the outputs Y of the network. The values of the updated inputs $A_U$ of the network that are needed to drive the error E to a predetermined minimum are determined, and the actual physical input parameters P of the process changed to correspond to the updated inputs values $A_U$ producing the minimum error. The present invention can be used in both a batch initialization situation and/or in an on-going process control situation.

2 Claims, 6 Drawing Sheets

Input Signal At Port $P_{in}$ = $Q_{in} = \sum_{z=1}^{m} W(z) * I(z) + T$

Activation Signal on Line $L_{out}$ At Port $P_{out}$ = $Q_{out} = S(Q_{in})$ $S = [1 + exp(-Q_{in})]^{-1}$

TIME-DEPENDENT PROCESSES: LEARNING PHASE

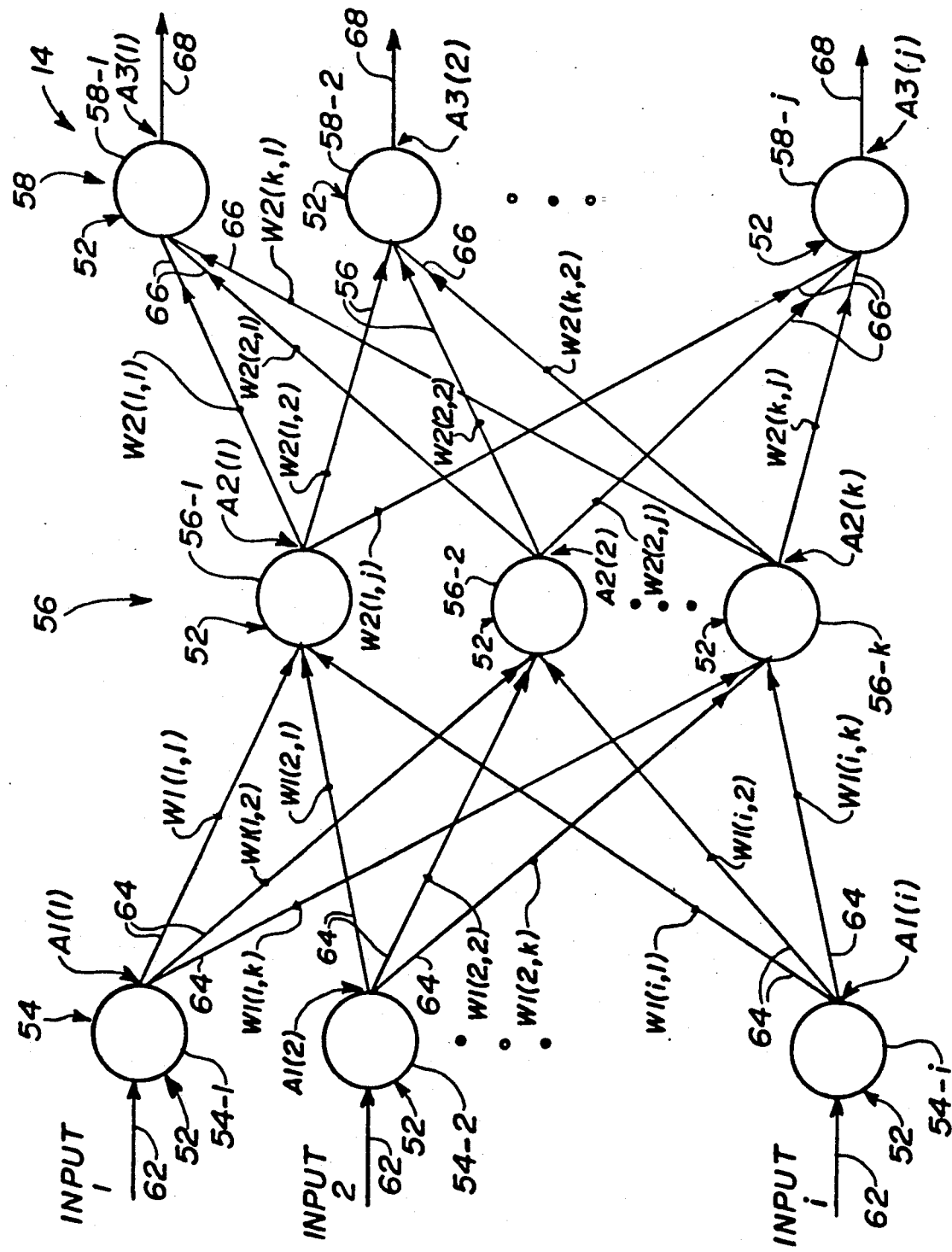

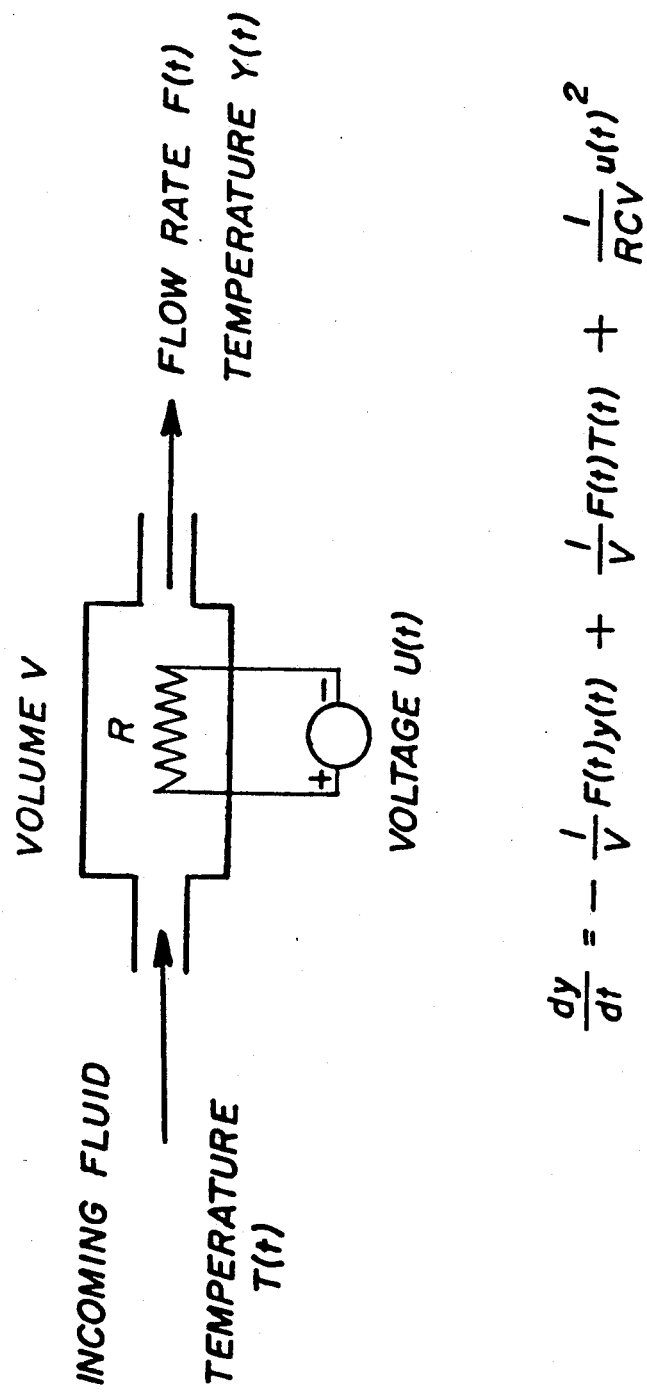

HEAT EXCHANGER EXAMPLE

HEAT EXCHANGER EXAMPLE

APPARATUS AND METHOD FOR CONTROLLING A PROCESS USING A TRAINED PARALLEL DISTRIBUTED PROCESSING NETWORK

This application is a continuation of application Ser. No. 07/563,735 filed Aug. 3, 1990, now abandoned, which is itself a continuation of 07/316,717, filed Feb. 28, 1989, now abandoned.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND OF THE INVENTION

1. Field of the Invention

The present invention relates to a method and an apparatus for controlling a process, and, in particular, to such a method and an apparatus that makes use of the information stored in a parallel distributed processing network that is previously trained to simulate the process.

2. Description of the Prior Art

Control of a manufacturing process may be broadly divided into two classes of activity: (1) determining the initial parameter settings or initial constituent concentrations for a process ("batch initialization"); and (2) ongoing adjustment of parameter settings ("on-going process control"). The latter class of activity may itself be subdivided into those adjustments that are able to be made without reference to the history of the process adjustments (termed "static" adjustments) and those adjustments which are dependent upon the preceding process adjustments (termed "dynamical" adjustments). These activities are interrelated in the sense that an initial setting of a parameter or initial concentration of a constituent may be viewed as an adjustment of the variable from its random position or from an undetermined concentration whereas an ongoing adjustment may be viewed as a timed sequence of initial parameter settings.

There is a prevalent attitude that a so-called parallel distributed processing network ("PDPN") may have utility in supervisory control of physical processes. For example B. Widrow discussed the control of two physical processes with feed-forward neural networks at the December 1988 meeting "Neural Information Processing Systems", Denver, Colo.

In such a role the parallel distributed processing network is used as a conceptual model that relates the process input parameters to the output characteristics of the physical process in a feed forward manner. This arrangement is satisfactory if it is desired merely to know how certain predetermined alterations of the inputs would affect the characteristics of the output product. In process control situations, however, what is desired is to know a priori is exactly what the input parameters should be in order to produce an output product having desired characteristics.

Accordingly, in view of the foregoing it is believed desirable to provide a control arrangement using a parallel distributed processing network that would enable an operator to determine what input parameters of a physical process are needed in order to obtain predetermined characteristics in the product of the process, whether used in a batch initialization situation or on-going process control.

SUMMARY OF THE INVENTION

The present invention relates to a method and apparatus for controlling a physical process of the type in which predetermined inputs having predetermined physical parameters P are used to produce a product having physical characteristics C associated therewith. A parallel distributed processing network, previously trained to simulate the process, is responsive to input activations A to produce outputs Y. The activations are representative of the input parameters P of the process and the outputs are representative of the characteristics C of the product of the process.

In accordance with the invention a set of goal signals G corresponding to the desired physical characteristics D of the product of the process are produced and used to generate a signal representative of the error E between the goal signals G and the outputs Y of the network. The values of the updated inputs $A_U$ of the parallel distributed processing network that are needed to drive the error E to a predetermined minimum are determined, and the actual physical input parameters P of the process are changed to correspond to the updated inputs values $A_U$ producing the minimum error. The present invention can be used in both a batch initialization situation and/or in an on-going process control situation, whether for static or dynamical adjustments.

BRIEF DESCRIPTION OF THE DRAWINGS

The invention will be more fully understood from the following detailed description thereof, taken in connection with the accompanying drawings, which form a part of this application and in which:

FIG. 4 is a stylized diagram of a parallel distributed processing network using in the preferred implementation of the present invention shown in FIGS. 1 and 2;

FIGS. 6 and 7 are, respectively, stylized diagrams of physical processes used in the Examples of the present invention discussed herein;

Figure 1:
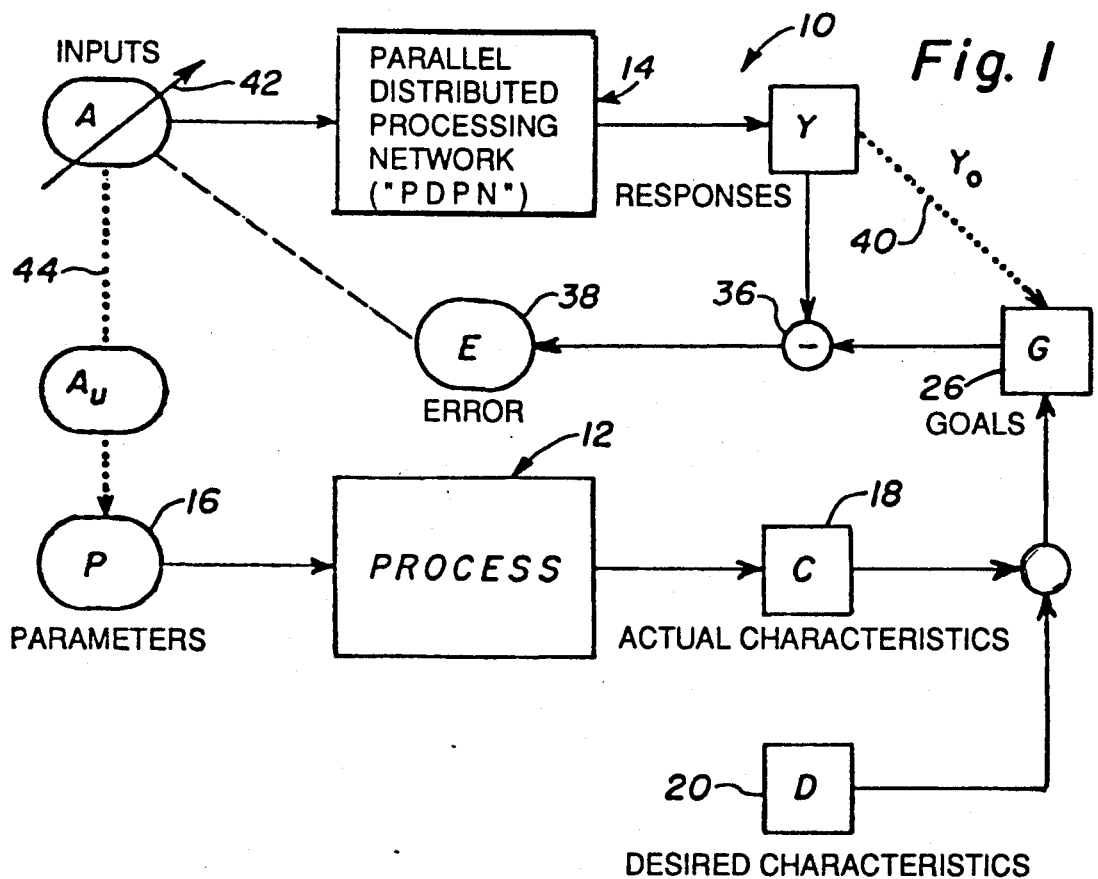
FIG. 1 is a block diagram of a process control arrangement in accordance with the present invention for controlling a physical process using a parallel distributed processing network which has been previously trained to simulate the process.

The Appendix containing Listing 1 (Pages A-1 to A-8) and Listing 2 (Pages A-9 to A-10) is attached to and forms part of this application. Listing 1 (Pages A-1 to A-8) is the source code, in the Fortran language, of a computer program which implements the method of this invention. Listing 2 (Pages A-9 to A-10) gives the data files and a sample run for the implementation of an example application using the process shown in FIG. 6.

DETAILED DESCRIPTION OF THE INVENTION

Throughout the following detailed description similar reference numerals refer to similar elements in all figures of the drawings.

Shown in FIG. 1 is a block diagram of a process control arrangement generally indicated by the reference character 10 in accordance with the present invention for controlling a physical process using a parallel distributed processing network ("PDPN") which has been previously trained to simulate the process. In FIG. 1 the physical process is generally indicated by the reference character 12 while the parallel distributed processing network is indicated by the character 14. The network 14 is responsive to a set of one or more inputs, or activations A, which produce a corresponding set of one or more responses Y predicting the actual response of the process 12 to various sets of activations.

The process 12 can, within the contemplation of the present invention, be any physical process acting upon any predetermined number of physical input parameters P, indicated in the block 16, to produce corresponding physical output products 18. The outputs 18 have actual physical characteristics C associated therewith. The term "physical process" is meant to denote any process that has material existence (that is, is perciptible through the senses) and is subject to the laws of nature, and could include any process that involves mechnical, chemical or biolgical phenomena.

In practice the actual physical characteristics C associated with the products 18 of the process 12 may differ in one or more respects from the set 20 of desired physical characteristics D. If signals representing the actual physical characteristics C and the desired physical characteristics D are not equal a set 26 of goal signals G may be generated. These goal signals G represent the target responses for the network 14 which correspond to the desired characteristics D of the products of the process 12, in a manner to be described below.

The parallel distributed processing network 14 contains at least two layers of processing elements. The processing elements are interconnected in a predetermined pattern and with predetermined connection weights therebetween. The feed forward network 14 has been previously trained to simulate the response of the process 12 to variation of the inputs 16 thereto. When trained, the connection weights between the processing elements in the network 14 contain information regarding the process in distributed form throughout the network. The network 14 may be trained using any one of various training techniques, such as the Generalized Delta Rule described in Rumelhart, Hinton and Williams, "Learning Internal Representations by Error Propagation", *Parallel Distributed Processing, Volume 1, Foundations*, Rumelhart and McClelland, editors, MIT Press, Cambridge, Mass. (1986). This rule is a generalization of the "Delta Rule" given by Widrow, "Generalization and Information Storage In Networks of ADELINE Neurons", *Self-Organizing Systems*, Yovitts, editor, Spartan Books, New York (1962). Alternatively, the network may be trained using the technique disclosed and claimed in copending application Ser. No. 07/285,534, filed Dec. 16, 1988 and assigned to the assignee of the present invention.

In accordance with this invention means generally indicated by reference character 36 is provided to generate a set 38 of error signals E representative of the error between the set of goal signals G and the responses Y of the network 14. Symbolically, $$E = (Y - G)^2 \tag{1A}$$

where $$G = D + (Y_0 - C) \tag{1B}$$

where $Y_0$ is the output of the network 14 when the activations $A_0$ are set equal to the input parameters P. The dotted connection line 40 between Y and G is meant to emphasize the fact that it is only the initial values $Y_0$ that are used in setting the goal G. If the network 14 simulates the process 12 accurately, then effectively $Y_0 = C$, and the goal G is equal to the desired process characteristics D.

The activations A are then altered as illustrated diagrammatically at 42, to determine the updated set of activations $A_U$ of the network 14 that are needed to drive the error E to a predetermined minimum, typically zero or some predetermined threshold. It should be understood that some of the activations A may be constrained within predetermined intervals.

The actual physical parameters P of the process 14 are then set equal to the activations $A_U$ that produce the minimum error E. This step is indicated by the dotted connection 44. The dotted line between A and P is meant to emphasize the fact that it is only the updated values $A_U$ that are used to set the input process parameters P. Although the use of the updated activations $A_U$ in the manner set forth above to an on-going process control situation may, perhaps, be more easily comprehended, changing the actual physical input parameters of the process to correspond to the updated activations $A_U$ that produce the minimum error E should be understood to apply as well to the batch initialization situation.

In one facet of a batch initialization situation, each control device of a system (e.g., a valve) must, of necessity, have some pre-existing setting. The pre-existing setting is typically randomly chosen, and usually has no relationship whatsoever to the particular manufacturing control environment in which the device is being used. In another facet of a batch initialization situation, e.g., determining the initial concentration of color constituents as in the formulation of paint, the initial concentrations of constituents of the mixture is undetermined. Nevertheless, changing the setting of a control device from its pre-existing random setting to some initialization setting or determining the initial concentrations of constituents to form a mixture should be understood as uses of the updated activations $A_U$ and are accordingly encompassed within the scope of the present invention.

The activations $A_U$ may be determined by any predetermined error minimization technique, for example, the Levenberg-Marquardt algorithm (e.g., the subroutine ZXSSQ from the IMSL Library, sold by IMSL, Inc. Houston, Tex.), or the conjugate gradient method (e.g., the subroutine UMCGG from the IMSL Library).

An alternative technique to determine the activations $A_U$, to be discussed in more detail herein, involves "training" the inputs A using stiff differential equations. In other words, the network is, in effect, trained on its inputs to send the response Y within some predetermined range of the goals G. If the goal G is feasible within the constraints on the activations A the error converges toward zero. If, in addition, the network simulation of the process is highly accurate so that the output of the network 14 is equal to the output of the physical process 12, setting the input process parameters P equal to updated activations $A_U$ results exactly in the desired output characteristics D. If the network simulation model is less accurate and $Y_0$ does not equal C, setting the input process parameters P equal to the updated activations $A_U$ will move the process characteristics C toward the desired output D.

Once the parameters P have been set equal to $A_U$, the characteristics C of the products 18 of the process 12 are checked. If the actual characteristic C are within a predetermined acceptable range of the desired characteristics D then the control cycle is complete. If, on the other hand, after alteration the difference between the actual characteristics C and the desired characteristics D is still above some predetermined amount, the control loop process is iterated as necessary to bring the actual characteristics into an acceptable range of difference with the desired characteristics.

Figure 2:
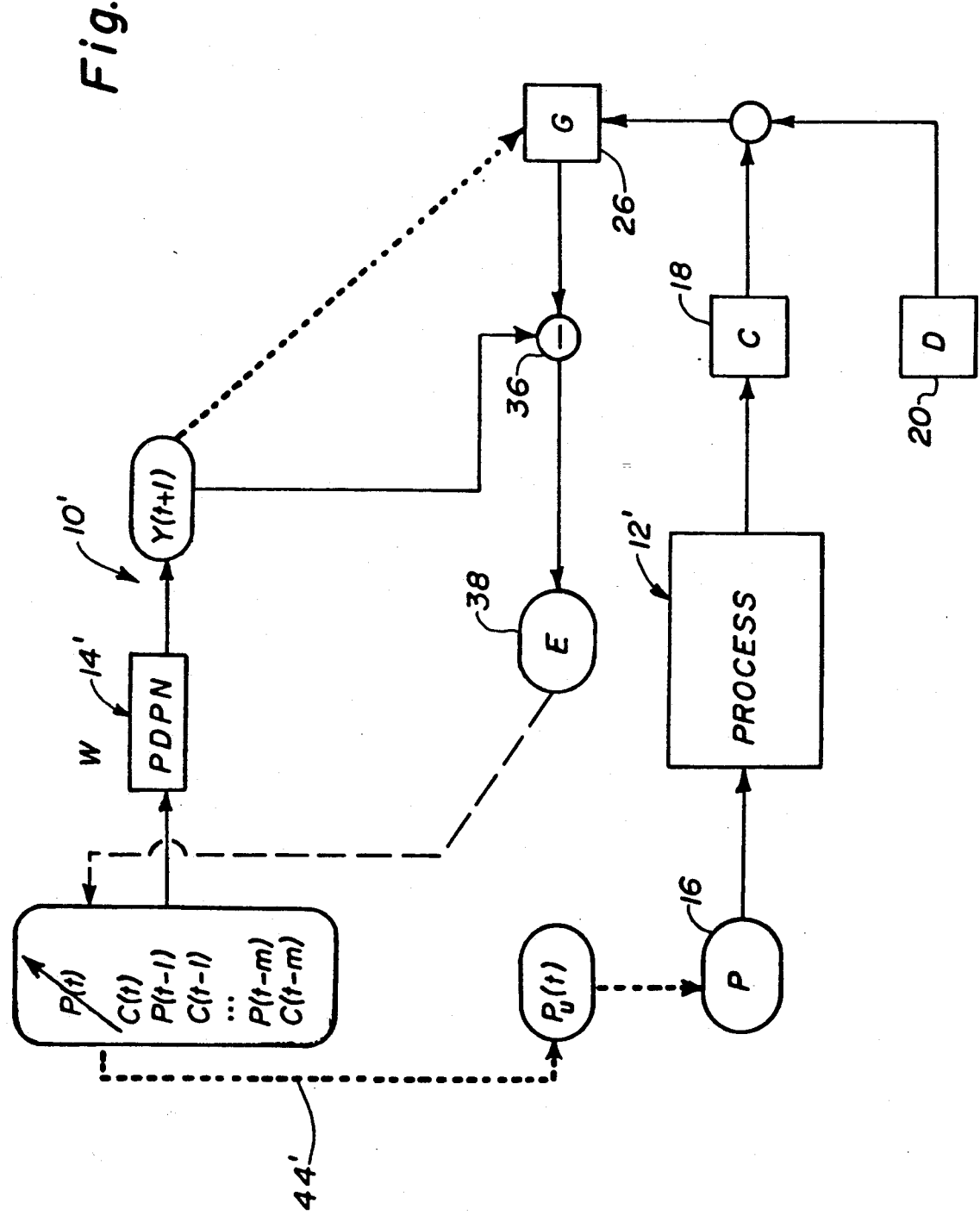
FIG. 2 is a block diagram generally similar to FIG. 1 of a process control arrangement in accordance with the present invention for controlling a time dependent physical process using a parallel distributed processing network which has been previously trained to simulate the process.

In the process control arrangement shown in FIG. 1, it is implicitly assumed that there is a direct and immediate (i.e., static) one-to-one correspondence between the process control parameters P and the output properties C, regardless of the time history of the process. In some processes, there are dynamical (i.e., time-dependent) relationships between P and C, so that the output C depends upon the past time history of the process parameters P. It should be understood that the present invention is equally applicable to the control of dynamical as well as static systems. FIG. 2 illustrates a block diagram of a process control arrangement generally indicated by the reference character 10' in accordance with the present invention for controlling a time dependent physical process 12'.

Figure 3:
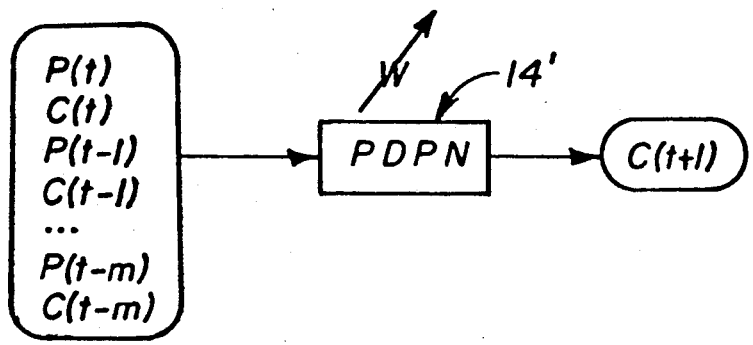
FIG. 3 is a block diagram illustrating the training phase of a parallel distributed processing network to simulate the time dependent physical process illustrated in FIG. 2.

FIG. 3 is a block diagram illustrating the training phase of a parallel distributed processing network 14' to simulate the time dependent physical process 12' illustrated in FIG. 2. For a dynamical system, the process parameters P[t] and outputs C[t] at the present time are augmented by those for the previous time t−1 (denoted P[t−1] and C[t−1], respectively) and up to m other previous times are all used as activations to the network 14'. The outputs to which the network 14' is trained are the process properties C[t+1] at the next time. If prediction past the next time step is desired, additional outputs C[t+2]...C[t+n] are added to the training set. Each available sample time t provides one exemplar in the training data set.

During training, the augmented time-dependent data set is presented to the network 14', and the connection weights W of the network 14' are adjusted to minimize the error in the prediction of the outputs C[t+1] as usual. When training is complete, the weights W contain the information for a fully dynamical simulation of the time dependent physical system 12'.

During the process control phase illustrated in FIG. 2, the connection weights W of the network 14' are fixed, and in order to minimize the difference E between the model output Y[t+1] and the goal G at the next time step, the process control parameters P[t] at the present time are varied. The other activations to the network (C[t], P[t−1], C[t−1], ... P[t−m], C[t−m]) are fixed at their observed values during the variation of the parameters P[t].

Once the updated process inputs parameters $P_U[t]$ which minimize the error E are determined, the process parameters P are set equal to $P_U[t]$, as shown by 44' in FIG. 2. In this way, the network 14' can be used for the supervisory control of any dynamical process.

With reference to FIG. 4 shown is a stylized diagram of a preferred form of the distributed parallel processing network 14 which the present invention shown in FIGS. 1 and 2 uses. The network 14 is configured as a back propagation network and comprises individual processing elements 52 configured with at least a first layer 54 and a second layer 58. The layer 54 is termed the "input layer", and the layer 58 is the "output layer". In addition there may zero or more intermediate layers called "hidden layers". In FIG. 4 shown is one hidden layer 56. The processing network 14 is organized such that the input layer 54 contains a set of at least one to i processing elements, the hidden layer 56 has a set of at least one to k processing elements, and the output layer 58 has a set of at least one to j processing elements therein. When implementing the network an operator would specify the values i, k and j.

Figure 5:
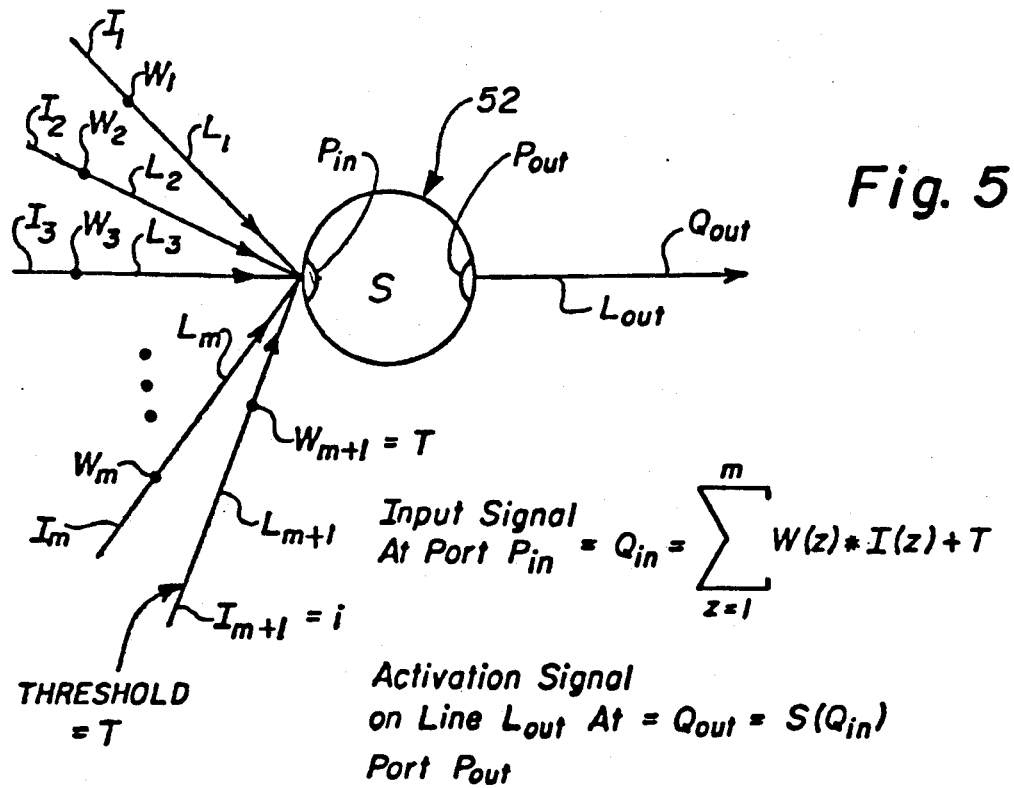
FIG. 5 is a generalized representation of a processing element used in the parallel distributed processing network shown in FIG. 4.

FIG. 5 is a generalized representation of a processing element 52 used throughout the network 14. Each processing element 52 has an input port $P_{in}$ and an output port $P_{out}$. The processing element is responsive to one or a plurality of excitation signal(s) $l_1$ through $l_m$ presented at the input port $P_{in}$ and is operative to produce an activation signal $Q_{out}$ carried on a line $L_{out}$ connected at the output port $P_{out}$. Each of the excitations $l_1$ through $l_m$ is connected to the input port $P_{in}$ of the element 52 over a respective line $L_1$ through $L_m$ that has a predetermined respective connection weight $W_1$ through $W_m$. The activation signal $Q_{out}$ that is produced on the line $L_{out}$ at the output port $P_{out}$ of the processing element 52 is a function of the input signal $Q_{in}$ applied at the input port $P_{in}$. The input signal $Q_{in}$ is the summation, over all of the input lines to the processing element, of the inner product of the strength of a given excitation signal l and the connection weight W of the line L carrying that signal to the processing element, scaled by the squashing function S for that processing element. Symbolically, the activation signal $Q_{out}$ at the output port $P_{out}$ is functionally related to the input signal $Q_{in}$ $$\text{Signal on line } L_{out} = Q_{out} = S(Q_{in}). \tag{2}$$

$$\text{where } Q_{in} = \sum_{z=1}^{m} W_z l_z + T \tag{3}$$

where T is the threshold of the processing element 52. The threshold T can be considered as an additional weight from an input line (m+1) having a constant excitation signal of one (1), similar to the prior art. The squashing function S can take the form of the sigmoid function, $$S = [1 + exp(-Q_{in})]^{-1} \tag{4}$$

although any other desired monotonically nondecreasing squashing function may be used. If some other squashing function is used the detailed forms of the Equations (6) and (7) would, of course, be different from those set forth hereinafter. However, the teachings of the present invention would have equal applicability thereto.

As may be seen from FIG. 4 each of the processing elements 54-1 through 54-i in the input layer 54 is connected to at least one of a predetermined number i of network input signals on a respective input line 62. The signals on the input lines 62 correspond to the activations of the network 14 discussed earlier. Each of the lines 62 may have a predetermined weight associated therewith, similar to the situation discussed above in the case of the generalized processing element. Each of the processing elements in the input layer 54 is operative, in a manner similar to that described above for the generalized processing element, to produce a respective activation signal A1[1] through A1[i] at the output port thereof.

The output port of each of the i processing elements in the input layer 54 is connected to at least one of the k processing elements 56-1 through 56-k in the intermediate layer 56 of processing elements by a respective line 64. In a typical case, the output port of each of the processing elements in the input layer 54 is connected to the input port of each of the processing elements in the intermediate layer 56. Each such interconnection line 64 has a connection weight W1[i,k] associated therewith.

In a fashion similar to that discussed above the processing elements in the intermediate layer 56 respond to the inputs applied thereto to produce an activation signal A2[k] at the output port thereof. In similar fashion, the output port of each of the k processing elements in the intermediate layer 56 is connected to the input port of at least one of the j processing elements in the output layer 58 of processing elements on a line 66. In the preferred case the output port of each element in the intermediate layer 56 is connected to the input port of one of the processing elements in the output layer 58. The lines 66 each have a connection weight W2[k,j] associated therewith.

The processing elements in the output layer 58 respond to the inputs thereto to produce an activation signal A3[j] at the output port thereof. These output signals are carried over respective output lines 68. The output signals on the lines 68 correspond to the outputs Y discussed earlier.

With such a network as that shown in the FIG. 4, the error signal E in FIG. 1 is given by $$E = \sum_j (Y[j] - G[j])^2 \tag{5}$$

where G[j] is element j of the goal vector. The symbol A in FIG. 1 corresponds to A1 in FIG. 4 and similarly Y in FIG. 1 corresponds to A3 in FIG. 4.

If the required activations A1[i] of the network 14 are obtained by training using a method similar to the conventional Generalized Delta Rule using the method of steepest descent, then $$\Delta A1[i] = \sum_k W1[i,k]A2[k](1 - A2[k]) \times \sum_j (A3[j] - G[j])A3[j](1 - A3[j])W2[k,j] \tag{6}$$

and training is accomplished iteratively by setting $$A1[i]^{n+1} = ETA \Delta A1[i] + A1[i]^n$$

where ETA is the training rate.

Alternatively the required activations A1[i] can be obtained by using standard optimization techniques such as a conjugate gradient technique or the Levenberg-Marquardt algorithm to find the values of A1[i] yielding the minimum error E in Equation (5).

In the preferred implementation the required activations A1[i] are obtained from the differential equations (7):

$$d/dt(A1[i]) = \sum_k W1[i,k]A2[k](1 - A2[k]) \times \tag{7}$$

$$\sum_j (A3[j] - G[j])A3[j](1 - A3[j])W2[k,j]$$

Equation (7) is a set of nonlinear ordinary differential equations for the continuous variables A1[i]. The initial conditions are A1=A0=P. This system of equations may be integrated numerically to solve the equations, such that, as time increases, the activations A1 converge to steady state values corresponding to those giving a local minimum least-squares prediction error. In the preferred instance, the equations are numerically solved using the stiff integration package DGEAR from the IMSL Library. The original version of the algorithm used in the package DGEAR is disclosed in Gear, C. W., *Numerical Initial Value Problems in Ordinary Differential Equations*, Prentice-Hall, Englewood Cliffs, N.J. (1971).

Because the differential Equation (7) are formulated to decrease the mean square prediction error, in the direction of steepest descent, the prediction error will always decrease.

It is often desirable or sometimes necessary to constrain some or all of the activations A to remain within a fixed range of values, $$Min[i] < A[i] < Max[i] \tag{8}$$

Regardless of what method is used to minimize the error E, the constraint (8) can be generated as follows.

In minimization the variable Z (which has no limits) is used, where $$Z[i] = -\log\left[\frac{Max[i] - Min[i]}{A[i] - Min[i]} - 1\right] \tag{9A}$$

and log is the natural logarithm. As Z[i] varies over the entire range from $-$ infinity to $+$ infinity the activation $$A[i] = Min[i] + \frac{Max[i] - Min[i]}{(1 + e^{-Z[i]})} \tag{9B}$$

only varies within the range given in Equation (8). In this manner range constraints on the activations can be maintained.

A specific implementation of the method for finding the input activations $A_U$ which minimize the error E between the goal G and the outputs Y of a three-layer back propagation network is shown in the VAX Fortran PROGRAM SET of Listing 1. This program determines the input activations $A_U$ corresponding to a desired set of output characteristics G. For a batch initialization situation, as shown by the program in Listing 1, the initial inputs $A_0$ to the parallel distributed processing network are randomly selected. For an ongoing process control situation, the initial conditions $A_0$ are the system's actual operating parameters P. The program SET is executed once for each iteration in the on-going process control mode. Following some introductory comments in lines 3-20, the parameters, vectors, arrays, and common blocks used by the program are defined in lines 21-48. The input files used by the program are defined in lines 49-63:

| | |
|---|---|
| SET.PRM | Input parameters: number of input, output, hidden nodes; error tolerance, etc. |
| OUTPUT.DAT | Goal G for outputs |
| CONSTRAINTS.DAT | Minimum and maximum constraints on the values for the input activations |
| TRAIN.W | Connection weights for the trained network |

The program writes monitoring information to the computer screen (Fortran unit 6) and the minimum-error solution for the input activations $A_u$ to the file SET.OUT. A specific example of the contents of these input/output files is shown in Listing 2.

The input data files are read in lines 64-105. The initial values for the activations A (denoted by the variable Y in the program) are defined in lines 107 to 161. For activations which are free to vary, values are selected randomly between the minimum and maximum values specified in the file CONSTRAINTS.DAT. A total of NRAM such samples of the input activations are selected, and the RMS error between the computed output and the goal is computed for each case. The initial conditions with the minimum RMS error are used. In lines 151-160, the activations are scaled to the unrestricted variables Z used internally via Equation (9A).

Lines 162-176 initialize some values to be used in the subroutine DGEAR which solves the differential Equations (7). Lines 177 to 202 are a loop that is repeatedly executed until the solution reaches the specified tolerance TOLER or maximum number of effective training presentations TMAX. Inside this loop, subroutine DGEAR is called to advance the solution the differential equations (7) from time T to time TEND, with both T and TEND being increased on each pass through the loop. The IMSL subroutine DGEAR calls the subroutine DIFFUN which supplies the time derivatives dZ/dt, as discussed below. Information on the RMS error after each call to DGEAR in printed to the computer screen (in line 193) for monitoring purposes.

Once a solution has been obtained to specified tolerance, the program SET does a forward pass through the network in lines 205-242 to compute the outputs Y corresponding to the updated activations $A_U$. These outputs Y, the output goal G, and the updated activations $A_U$ are printed to the screen in lines 243-260, and the activations are written to the file SET.OUT in line 261 before the program stops.

The subroutine DIFFUN in lines 270-412 is called by DGEAR to evaluate the time derivatives DZ=dZ/dt as a function of the time T and the variables Z. Recall that the variables Z are the values of the activations scaled by Equation (9A). Lines 271-291 give the parameters, vectors, arrays, and common blocks used in the subroutine. In lines 292-312, the internal variables Z are converted using Equation (9B) to activations A, denoted in the program by TRIN. Lines 213-389 are a computation of the activations (A2, A3 in FIG. 4) in the network based on the input activations TRIN, along with an evaluation of the time derivatives of the input activations given in Equation (7). Finally, lines 394-408 convert from dA/dt to dZ/dt, which is the output of DIFFUN required by DGEAR.

The invention may be more fully appreciated from the following examples.

EXAMPLE 1

Figure 6:
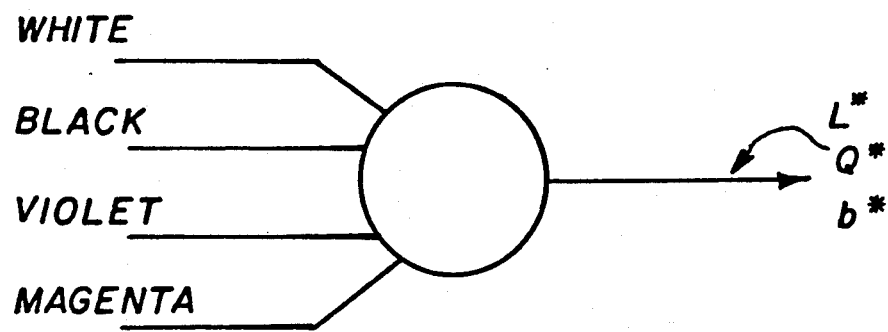

The first example under consideration involves a paint formulation process, shown in FIG. 6, in which plural input lines, each carrying a predetermined different color of paint, are fed into a mixing vat. A single output line carries the output product, the paint mixture. One of the input lines carries white paint, a second black paint, a third violet paint and a fourth magenta paint. When a panel is coated with the resulting output mixture, the properties of brightness (L*), red-to-blue color (a*) and yellow-to-green color (b*) can be measured. The example, including Tables 1 and 2 set forth herein, is derived from the article by Alman and Pfeifer in *Color Research and Applications*, Volume 12, Number 4, pages 210 to 222, August 1987. The entry in sample 10 is believed to have been printed with the incorrect sign, which has been corrected in Table 1, as noted by the asterisk.

TABLE 1

| | Colorant Concentrations | | | | Color response | | |
|---|---|---|---|---|---|---|---|
| Sample | White ($C_w$) | Black ($C_b$) | Violet ($C_v$) | Magenta ($C_m$) | L* | a* | b* |
| Estimation samples | | | | | | | |
| 1 | 1.00 | 0.00 | 0.00 | 0.00 | 95.29 | −.75 | 1.30 |
| 2 | 0.75 | 0.25 | 0.00 | 0.00 | 68.28 | −.85 | −2.54 |
| 3 | 0.50 | 0.50 | 0.00 | 0.00 | 54.85 | −.87 | −2.90 |
| 4 | 0.25 | 0.75 | 0.00 | 0.00 | 39.58 | −.79 | −3.17 |
| 5 | 0.00 | 1.00 | 0.00 | 0.00 | 2.91 | −.05 | −2.05 |
| 6 | 0.75 | 0.00 | 0.25 | 0.00 | 58.48 | 19.59 | −32.04 |
| 7 | 0.50 | 0.00 | 0.50 | 0.00 | 44.62 | 25.32 | −38.56 |
| 8 | 0.25 | 0.00 | 0.75 | 0.00 | 29.92 | 29.75 | −41.43 |
| 9 | 0.00 | 0.00 | 1.00 | 0.00 | 2.73 | 7.23 | −4.81 |
| 10 | 0.75 | 0.00 | 0.00 | 0.25 | 59.15 | 43.27 | −15.67* |
| 11 | 0.50 | 0.00 | 0.00 | 0.50 | 47.59 | 53.13 | −13.56 |
| 12 | 0.25 | 0.00 | 0.00 | 0.75 | 36.60 | 57.13 | −7.86 |
| 13 | 0.00 | 0.00 | 0.00 | 1.00 | 13.34 | 39.94 | 11.22 |
| 14 | 0.00 | 0.75 | 0.25 | 0.00 | 2.38 | 1.94 | −3.12 |
| 15 | 0.00 | 0.50 | 0.50 | 0.00 | 2.28 | 3.42 | −3.59 |
| 16 | 0.00 | 0.25 | 0.75 | 0.00 | 2.38 | 4.95 | −4.15 |
| 17 | 0.00 | 0.75 | 0.00 | 0.25 | 2.38 | 7.30 | −3.59 |
| 18 | 0.00 | 0.50 | 0.00 | 0.50 | 3.08 | 13.71 | −2.88 |
| 19 | 0.00 | 0.25 | 0.00 | 0.75 | 5.16 | 20.71 | −.63 |
| 20 | 0.00 | 0.00 | 0.75 | 0.25 | 2.53 | 10.96 | −5.76 |
| 21 | 0.00 | 0.00 | 0.50 | 0.50 | 3.34 | 14.72 | −4.78 |

TABLE 1-continued

| | Colorant Concentrations | | | | Color response | | |
|---|---|---|---|---|---|---|---|
| Sample | White ($C_w$) | Black ($C_b$) | Violet ($C_v$) | Magenta ($C_m$) | L* | a* | b* |
| 22 | 0.00 | 0.00 | 0.25 | 0.75 | 4.58 | 20.21 | −2.79 |
| 23 | 0.50 | 0.25 | 0.25 | 0.00 | 48.47 | 11.43 | −21.07 |
| 24 | 0.25 | 0.50 | 0.25 | 0.00 | 34.57 | 8.14 | −16.13 |
| 25 | 0.25 | 0.25 | 0.50 | 0.00 | 31.52 | 17.49 | −28.04 |
| 26 | 0.50 | 0.00 | 0.25 | 0.25 | 42.45 | 31.97 | −29.28 |
| 27 | 0.25 | 0.00 | 0.50 | 0.25 | 28.19 | 31.11 | −33.14 |
| 28 | 0.25 | 0.00 | 0.25 | 0.50 | 29.43 | 36.71 | −25.31 |
| 29 | 0.50 | 0.25 | 0.00 | 0.25 | 46.31 | 26.08 | −15.04 |
| 30 | 0.25 | 0.50 | 0.00 | 0.25 | 33.15 | 19.05 | −12.76 |
| 31 | 0.25 | 0.25 | 0.00 | 0.50 | 31.99 | 34.59 | −14.95 |
| 32 | 0.00 | 0.50 | 0.25 | 0.25 | 2.19 | 8.09 | −3.99 |
| 33 | 0.00 | 0.25 | 0.50 | 0.25 | 2.33 | 8.80 | −4.55 |
| 34 | 0.00 | 0.25 | 0.25 | 0.50 | 2.76 | 13.35 | −4.13 |
| 35 | 0.25 | 0.25 | 0.25 | 0.25 | 30.19 | 23.64 | −23.02 |
| 36 | 0.25 | 0.25 | 0.25 | 0.25 | 30.11 | 23.66 | −23.03 |
| 37 | 0.25 | 0.25 | 0.25 | 0.25 | 30.05 | 23.45 | −22.88 |
| 38 | 0.75 | 0.12 | 0.13 | 0.00 | 62.19 | 9.54 | −18.16 |
| 39 | 0.12 | 0.75 | 0.13 | 0.00 | 25.23 | 3.12 | −8.85 |
| 40 | 0.12 | 0.13 | 0.75 | 0.00 | 19.82 | 22.73 | −32.06 |
| 41 | 0.75 | 0.12 | 0.00 | 0.13 | 60.28 | 22.52 | −13.70 |
| 42 | 0.12 | 0.75 | 0.00 | 0.13 | 23.85 | 8.33 | −8.27 |
| 43 | 0.12 | 0.13 | 0.00 | 0.75 | 23.69 | 41.21 | −9.42 |
| 44 | 0.75 | 0.00 | 0.12 | 0.13 | 57.33 | 26.52 | −24.85 |
| 45 | 0.12 | 0.00 | 0.75 | 0.13 | 18.73 | 28.53 | −34.22 |
| 46 | 0.12 | 0.00 | 0.13 | 0.75 | 22.08 | 40.28 | −14.96 |
| 47 | 0.00 | 0.75 | 0.12 | 0.13 | 2.20 | 4.84 | −3.30 |
| 48 | 0.00 | 0.12 | 0.75 | 0.13 | 2.19 | 8.01 | −5.17 |
| 49 | 0.00 | 0.12 | 0.13 | 0.75 | 4.62 | 19.82 | −2.06 |

TABLE 2

| | Colorant Concentrations | | | | Color response | | |
|---|---|---|---|---|---|---|---|
| Sample | White ($C_w$) | Black ($C_b$) | Violet ($C_v$) | Magenta ($C_m$) | L* | a* | b* |
| Checkpoint samples | | | | | | | |
| 50 | 0.50 | 0.17 | 0.17 | 0.16 | 45.28 | 22.09 | −22.57 |
| 51 | 0.17 | 0.50 | 0.17 | 0.16 | 26.32 | 14.92 | −16.25 |
| 52 | 0.17 | 0.17 | 0.50 | 0.16 | 23.79 | 23.52 | −28.38 |
| 53 | 0.17 | 0.17 | 0.16 | 0.50 | 24.53 | 31.31 | −19.67 |
| 54 | 0.34 | 0.33 | 0.33 | 0.00 | 38.98 | 12.56 | −22.20 |
| 55 | 0.00 | 0.34 | 0.33 | 0.33 | 2.29 | 10.05 | −4.28 |
| 56 | 0.34 | 0.00 | 0.33 | 0.33 | 33.98 | 33.25 | −29.88 |
| 57 | 0.34 | 0.33 | 0.00 | 0.33 | 37.46 | 27.13 | −15.02 |

The first 49 paint mixtures in Table 1 are used to train a three-layer back propagation network (i.e., one hidden layer) used as the PDPN in FIG. 1. The PDPN has four input nodes (i=4), one each for the input concentrations of the colors white, black, violet, and magenta. The three output nodes (j=3) represent the color indices L*, a*, and b* corresponding to the mixed paint. Eight hidden nodes (k=8) were used in the PDPN model. Scaled units were used internally in the training and process control models, with each of the inputs and outputs individually scaled by linear transformation to place their minimum value in the training set at 0.1 and their maximum value in the training set at 0.9. As with Example 2, training was conducted on a CRAY X-MP/28 supercomputer.

The complete data files and a sample run of the process control program SET are shown in Listing 2 (pages A-9 and A-10). In the listing, normal face type corresponds to the actual contents of the data files and printer output, while the text in bold is explanatory annotation. The data file SET.PRM specifies the configuration of the back propagation model (4 input nodes, 3 output nodes, 8 hidden nodes), the error tolerance and maximum number of iterations used in determining the process input parameters A, and the number of random trials to be used in choosing the initial values of A. The data file TRAIN.W contains the 57 weights W of the PDPN simulation model.

In this example, begin with the paint mixture number 51, with a composition of 0.17 white, 0.50 black, 0.17 violet, 0.16 magenta. The object is to move from this operating condition to the one with the output color given in paint mixture number 52, by adjusting the concentrations of only the black and violet pigments. The file CONSTRAINTS.DAT shows that the first (white) and fourth (magenta) colorants have their concentrations fixed at the scaled values corresponding to concentration of 0.17 and 0.16, respectively, while the concentrations of the second and third colorants (black and violet) are permitted to vary over a wide range. The file OUTPUT.DAT specifies the goal values G for the output Y: a color with L*=23.79, a*=23.52, and b*=−28.38.

The sample run gives the information which the PROGRAM SET prints to the screen. There are 4 input process parameters A, corresponding to the two fixed (white, magenta) and the two randomly selected (black, violet) initial concentrations. As the black and violet concentrations are varied, the output RMS error E between the goal color G and modeled color components Y decreases monotonically to a small amount (0.03%). The final result is a model determination of the concentrations which should be used to produce the desired color. The program generated a color with concentrations of 0.161 for black and 0.515 for violet, very close to the nominal concentrations of 0.17 for black and 0.50 for violet in the mixture actual produced.

This foregoing example also serves to illustrate the use of the invention in a batch initialization situation. The problem presented in a batch initialization situation is as follows: What should be the initial settings of the colorant parameters P (colorant concentrations) if it is desired to formulate a target color, such as that given by paint mixture number 52 ?.

Similar to the aspect of the Example discussed above, the program generates one thousand (1000) sets of input concentrations at random (page A-2, lines 107 to 160). The set of input concentrations giving the color response closest to the desired one was used for the input parameter settings. From this randomly generated starting point the program gave the results summarized in Table 3.

TABLE 3

| sample | colorant | actual concentration | predicted concentration |
|---|---|---|---|
| 52 | white | 0.17 | 0.17 |
|  | black | 0.17 | 0.16 |
|  | violet | 0.50 | 0.51 |
|  | magenta | 0.16 | 0.16 |

It may be seen that the predicted concentrations are extremely close to those which actually produced the desired color.

EXAMPLE 2

An example of dynamical process control is the heat exchanger illustrated in FIG. 7, which appears in problem 2.15 of Graham C. Goodman and Kwai Sang, *Adaptive Filtering Prediction and Control*, Prentice-Hall Englewood Cliffs, N.J. (1984). The objective of this example is to provide dynamical control of the output temperature y of the heat exchanger by varying the voltage u of the heater, in the presence of known but uncontrolled changes in the input temperature T and the flow rate F. The relationship between the temperature Y, the voltage u, the flow rate F and the input temperature T is defined by the differential equation:

$$dy/dt = (-1/V) \cdot F(t) \cdot y(t) + (1/V) F(t) \cdot T(t) + 1/(RCV) \cdot u(t)^2.$$

For this example, both the volume V of the heat exchanger and the time constant RC were set to the value of one. For any time interval in which the temperature (T), flow rate (F), and voltage (u) are kept constant, the exact analytic solution to the differential equation shown in FIG. 7 for the output temperature y is $$y = y_0 \exp(-F^*t) + (T + u^*u/F)^* [1 - \exp(-F^*t)]$$

Here $y_0$ represents the output temperature at the beginning of the time interval, $t=0$. Output temperatures using this exact solution will be called "Actual" results.

To generate a data set used for training the PDPN simulation model, input parameters F, T, and u were selected from the values given in this table:

| Parameter | Values Used in Training | | |
|---|---|---|---|
| F | 0.5 | 1.0 | 2.0 |
| T | 0.0 | 1.0 | 2.0 |

| Parameter | Values Used in Training | | |
|---|---|---|---|
| u | 0.0 | 0.5 | 1.0 |

For each of the 27 possible combinations of the three parameters (F, T, and u), the actual solution was obtained for 9 consecutive time intervals separated by the constant time increment dt=0.1. The next combination of input parameters (F, T, and u) was then selected, and the actual solution was continued. This resulted in a total of 243 consecutive samples of the exact solution to the differential equation describing the process shown in FIG. 7.

For the data set used in training the PDPN, as guided by FIG. 3, the following 8 inputs and one output were used:

| Inputs | Output |
|---|---|
| F[t] | y[t + dt] |
| T[t] |  |
| u[t] |  |
| y[t] |  |
| F[t − dt] |  |
| T[t − dt] |  |
| u[t − dt] |  |
| y[t − dt] |  |

The inputs and output were individually scaled by a linear transformation to place their minimum value in the training set at 0.1 and their maximum value in the training set at 0.9. A back propagation network with 4 hidden nodes was trained using these data to produce 41 connection weights embodying the PDPN simulation model of the dynamical process.

As an example of process control for this dynamical system, the input parameters F=1 and T=0.5 were set and fixed at nominal values. For a voltage u=0.5, the steady-state output temperature y=1.0 (giving 0.3142 in scaled units). From this starting point, the desired output temperature was changed to a value of about 1.3 (precisely 0.3772 in scaled units), and only the input voltage u was allowed to vary. The program SET. was used with the trained PDPN simulation model to determine the value of the input voltage u for 20 successive time intervals, and the actual process output temperature y was updated using the analytic solution given above.

Figure 8:
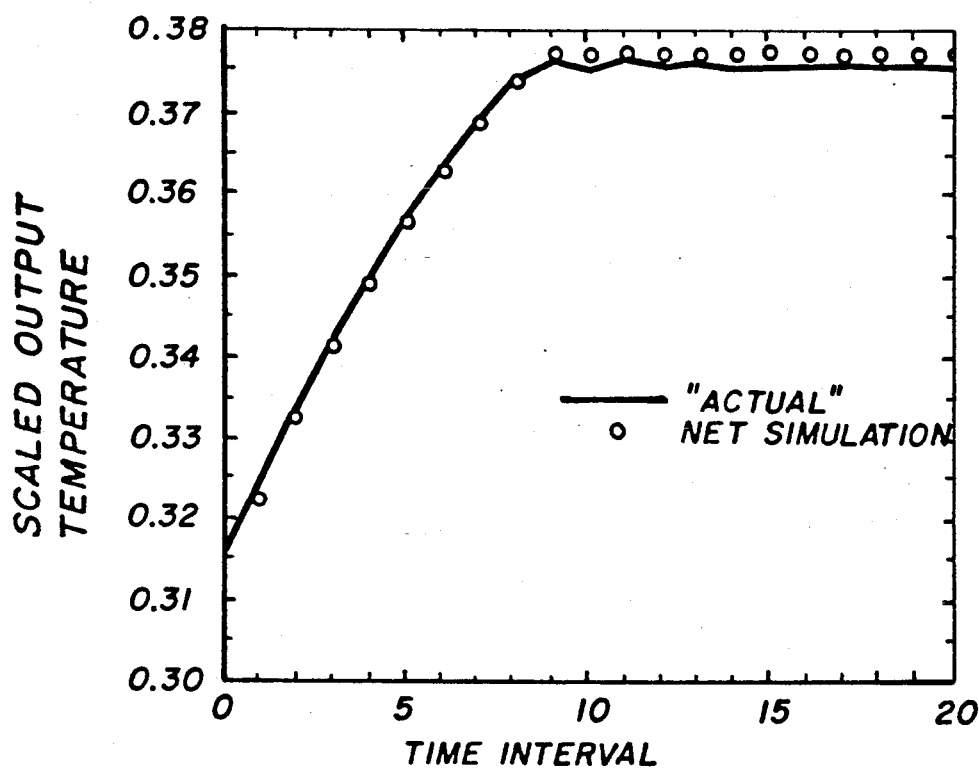
FIGS. 8 and 9, respectively, show the time evolution of the controlled output (temperature) and the input parameter (voltage) for an Example based on the process illustrated in FIG. 7.
Figure 9:
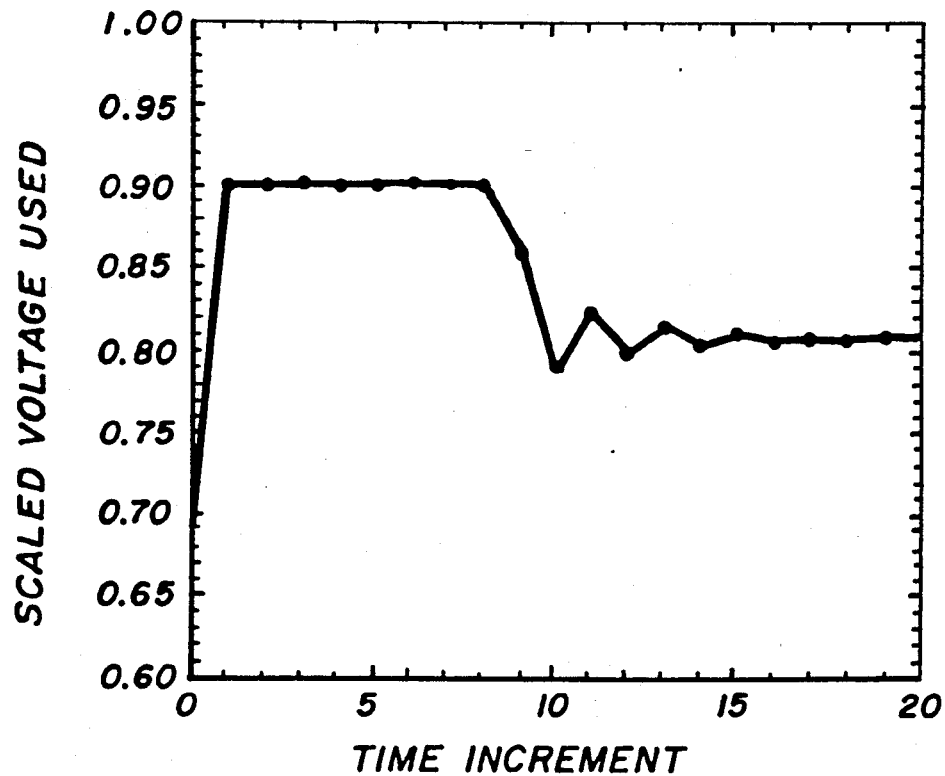

FIG. 8 shows the smooth transition of the actual output temperature y (solid line) from the scaled value of 0.3142 to 0.3772, under control of the input voltage u specified by the method of this invention. The circles show the accuracy of the PDPN model prediction of the output temperature, computed one step at a time from the actual present and previous process inputs. The control values for the input voltage u produced by the PDPN are show in FIG. 9. Beginning with the (scaled) steady-state value of 0.6656 for the voltage at the initial time, the voltage was immediately driven to its maximum allowed level (0.9) at the next time step. The voltage remained at the maximum level until the output temperature had almost reached its goal (at time interval 9), and then it quickly (about 6 time steps) was reduced to the scaled voltage (0.8127) required to maintain the scaled output temperature at the new value of 0.3772. This example demonstrates the efficient and stable control strategy generated by the invention for this example problem in dynamical control.

Those skilled in the art, having the benefit of the teachings of the present invention as hereinabove set forth may effect numerous modifications thereto. It should be understood that such modifications are to be construed as lying within the contemplation of the present invention as defined by the appended claims.

© E. I. DuPont de Nemours and Company, Inc. 1989
All Rights Reserved

```
1
2              program set
3       c
4       c               Implementation of Neural Net Algorithm
5       c               to solve the INPUT SETPOINT Problem:
6       c
7       c               What should the input be, given a desired output
8       c               and a trained neural backpropagation model?
9       c
10      c               This is the SET-POINT Problem in control theory
11      c
12      c               Uses 3-Layer Perceptron Model with Sigmoidal Response
13      c                       Function
14      c
15      c               Use initial RANDOM SAMPLING of inputs within constrained
16      c               range to choose the best possibility.
17      c
18      c               Solve the Problem as a System of STIFF ODE's in training
19      c               the INPUTS
20      c
21              parameter (inmax = 40)
22              parameter (intrnm = 20)
23              parameter (ioutmx = 20)
24      c
25              parameter (nymax = inmax)
26              parameter (nmeth = 6 * nymax)
27              parameter (nmiter = nymax * (nymax + 1))
28      c
29              parameter (nwk = ((4 * nymax) + nmeth) + nmiter)
30              dimension w1(inmax, intrnm)
31              dimension w2(intrnm, ioutmx)
32              dimension theta1(intrnm), theta2(ioutmx)
33              dimension trin(inmax), trout(ioutmx)
34      c
35              dimension y1(intrnm), y2(ioutmx)
36      c
37              dimension conmin(inmax),conmax(inmax),ifix(inmax)
38      c
39              common /vars/ w1, w2, trina, trouta, trin, trout, iin, iout,
40             &intern, toler, ndim, itrain, theta1, theta2, sigerr
41             &,conmin, conmax,ifix
42      c
43              dimension z(nymax), y(nymax), best(nymax)
44              dimension dz(nymax)
45              dimension iwk(nymax)
46      c
47              dimension work(nwk)
48              external diffun, fcnj
49      c
50      c               ... input/output file names and assignments
51      c
52      c           set.prm       = input parameter file.
53      c           output.dat    = file containing desired outputs.
54      c       constraints.dat   = file of constraints on inputs.
55      c           set.out       = file which at the end contains the vector
56      c                           which will give the desired output.
57      c           train.w       = calculated matrix of weights and thresholds
58      c
```

```
59              open(14, file = 'set.prm', status = 'old')
60              open(16, file = 'output.dat', status = 'old')
61              open(18, file = 'constraints.dat', status = 'old')
62              open(28, file = 'set.out', status = 'new')
63              open(29, file = 'train.w', status = 'old')
64       c
65       c              input control parameters
66       c
67              read (14,*) iin
68              read (14,*) iout
69              read (14,*) intern
70              read (14,*) toler
71              read (14,*) nmax
72              read (14,*) nram
73       c
74              jran = 19295
75       c
76       c              read in the w matrices
77       c
78              do 3330 j = 1, intern
79              read (29,*) (w1(i,j),i = 1, iin)
80         3330 continue
81              do 3332 j = 1, iout
82              read (29,*) (w2(i,j),i = 1, intern)
83         3332 continue
84              read (29,*) (theta1(i),i = 1, intern)
85       c
86              read (29,*) (theta2(i),i = 1, iout)
87       c
88       c              determine desired output
89       c
90              do 3334 i = 1, iout
91              read (16,*) trout(i)
92         3334 continue
93       c
94       c              read in constraints on variables
95       c
96              do 3360 i = 1, iin
97              read (18,*) conmin(i),conmax(i)
98                if (conmin(i).eq.conmax(i)) then
99                   ifix(i) = 1
100                 else
101                   ifix(i) = 0
102                 end if
103             best(i) = 0.0
104        3360 continue
105      c
106             neq = iin
107      c
108      c              Put INITIAL CONDITIONS into Y
109      c
110             write (6,*) '   NEQ = ', neq
111      c
112      c              Look for best initial conditions in
113      c              NRAM random tries
114      c
115             sigmin = 1000.0
116      c
117             do 944 jjj = 1, nram
118      c
119                do 13 i = 1, iin
120                yp = ran(jran)
121      c+debug+       write (6,*) yp
122                z(i) = -alog(1.0/yp - 1.0)
123         13     continue
124      c
```

```
125           t = 0.0
126           call diffun(neq, t, z, dz)
127   c+debug+      write (6,*) ' SIGERR for random trial ',jjj,' = ',sigerr
128           if (sigerr.gt.sigmin) go to 944
129   c
130   c             Here's a better set of starting conditions
131   c
132           sigmin = sigerr
133           do 945 i=1,iin
134   c
135   c             Scale z to y == best
136   c
137           yp = 1.0/(1.0+exp(-z(i)))
138           best(i) = conmin(i) + (conmax(i)-conmin(i))*yp
139    945   continue
140
141    944     continue
142   c
143   c             Start with the best values of inputs found in
144   c             the random search
145   c
146           write (6,*) 'The best starting values have SIGERR = ',sigmin
147   c
148           do 946 i=1,iin
149           y(i) = best(i)
150           write (6,*) i, y(i)
151   c
152   c             Put the SCALED parameters into z
153   c
154           if (conmin(i).eq.conmax(i)) then
155              z(i) = 0.5
156             else
157              yp = (best(i) - conmin(i))/(conmax(i)-conmin(i))
158              z(i) = -alog(1.0/yp - 1.0)
159             end if
160    946   continue
161           write (6,*)
162   c
163   c             Control parameters for DGEAR
164   c
165           eps = 1.0e-4
166           meth = 2
167           miter = 2
168   c
169           index = 1
170           t = 0.0
171           tprint = 1.0
172           tmax = nmax
173           sigrem = 1000.0
174   c
175           tstep = 1.0e-3
176   c
177    1000 continue
178   c-------
179           tend = tprint
180   c-------
181           call dgear(neq, diffun, fcnj, t, tstep, z, tend, eps, meth, miter
182          &, index, iwk, work, ier)
183           if (ier .gt. 100) then
184           write (6,*) ' ***** DGEAR Error IER = ', ier, ' *****'
185           goto 1999
186   c
187           end if
188   c
189           call diffun(neq, t, z, dz)
190   c
```

```
191   c                ... print stats
192.  c
193         write (6,240) sigerr, t, tstep
194    240 format(1x,1x,f8.4,2(2x,f12.2))
195   c
196         if (sigerr .lt. toler) goto 1999
197         if (abs(sigerr-sigrem).lt.0.01*toler) go to 1999
198         sigrem = sigerr
199         tprint = 2.0*tprint
200         if (t .gt. tmax) goto 1999
201   c
202         goto 1000
203   c
204    1999 continue
205   c
206   c-----------------------------------------------------------------
207   c
208   c              Now we have the "trained" inputs, so ...
209   c              determine the output for calculated vector
210   c
211   c-----------------------------------------------------------------
212   c
213         do 2218 j = 1, intern
214   c
215         sum = 0.0
216         do 2216 i = 1, iin
217         sum = sum + (trin(i) * w1(i,j))
218   c
219   c              ... perform sigmoid function on "arg"
220   c
221    2216 continue
222         arg = -(sum + theta1(j))
223         if (arg.gt.70.) arg=70.
224         y1(j) = 1.0/(1.0 + exp(arg))
225    2218 continue
226   c
227   c              ... compute output for this input
228   c                      at OUTPUT nodes
229   c
230         do 2215 j = 1, iout
231   c
232         sum = 0.0
233         do 2210 i = 1, intern
234         sum = sum + (y1(i) * w2(i,j))
235   c
236   c              ... perform sigmoid function on "arg"
237   c
238    2210 continue
239         arg = -(sum + theta2(j))
240         if (arg.gt.70.) arg=70.
241         y2(j) = 1.0/(1.0+exp(arg))
242    2215 continue
243   c
244         write (6,2254) int(t+0.5)
245    2254 format('    -- Program SET exited after ',I12,' iterations --')
246   c
247         write (6,*)
248         write (6,*) '             Output SPECIFIED    Output ACHIEVED'
249   c
250         do 2255 i = 1, iout
251         write (6,*) i,trout(i),y2(i)
252    2255 continue
253         write (6,*)
254         write (6,*)'       SET-POINT: Input Vector '
255   c
256   c              write out final input vector.
```

```
257   c
258         do 2260 i = 1, iin
259         write (6,*) i, trin(i)
260   2260  continue
261         write (28,*) (trin(i),i=1,iin)
262   c
263         stop
264   c
265   c
266         end
267   c
268   c
269   c
270         subroutine diffun(neq, t, z, dz)
271   c
272         parameter (inmax = 40)
273         parameter (intrnm = 20)
274         parameter (ioutmx = 20)
275   c
276         dimension w1(inmax, intrnm)
277         dimension w2(intrnm, ioutmx)
278         dimension trindel(inmax)
279         dimension trin(inmax), trout(ioutmx)
280         dimension y1(intrnm)
281         dimension theta1(intrnm), theta2(ioutmx)
282         dimension del1(intrnm), del2(ioutmx)
283         dimension conmin(inmax),conmax(inmax)
284   c
285         dimension dd1(intrnm), dd2(ioutmx), ifix(inmax)
286   c
287         common /vars/ w1, w2, trina, trouta, trin, trout, iin, iout,
288        &intern, toler, ndim, itrain, theta1, theta2, sigerr
289        &,conmin, conmax,ifix
290   c
291         dimension z(1), dz(1), y2(ioutmx)
292   c
293   c         Work in terms of SCALED VARIABLES
294   c
295   c              z  =  -alog(1/y' - 1)   where
296   c              y' =  (y - ymin)/(ymax-ymin)
297   c
298   c         or conversely
299   c
300   c              y  =  ymin + (ymax - ymin) * y'    where
301   c              y' =  1/(1+exp(-z))
302   c
303   c         unscale the variables z & put into trin == y
304   c
305         do 13 i = 1, iin
306         if (ifix(i).eq.1) then
307            trin(i) = conmin(i)
308         else
309           yp = 1.0/(1.0+exp(-z(i)))
310           trin(i) = conmin(i) + (conmax(i)-conmin(i))*yp
311         end if
312     13 continue
313   c
314   c              Zero out the Delta-Input vectors
315   c
316         do 810 i = 1, iin
317         trindel(i) = 0.0
318   c
319     810 continue
320   c
321         sigerr = 0.0
322   c
```

```
323   c              ... compute output for this input
324   c                        at INTERNAL nodes
325   c
326         do 218 j = 1, intern
327   c
328         sum = 0.0
329         do 216 i = 1, iin
330         sum = sum + (trin(i) * w1(i,j))
331     216 continue
332   c
333   c              ... perform sigmoid function on "arg"
334   c
335         arg = -(sum + theta1(j))
336         if (arg.gt.70.) arg=70.
337         y1(j) = 1.0/(1.0 + exp(arg))
338     218 continue
339   c
340   c              ... compute output for this input
341   c                        at OUTPUT nodes
342   c
343         do 215 j = 1, iout
344   c
345         sum = 0.0
346         do 210 i = 1, intern
347         sum = sum + (y1(i) * w2(i,j))
348     210 continue
349   c
350   c              ... perform sigmoid function on "arg"
351   c
352         arg = -(sum + theta2(j))
353         if (arg.gt.70.) arg=70.
354         y2(j) = 1.0/(1.0+exp(arg))
355         derr = abs(y2(j) -.trout(j))
356   c
357         sigerr = sigerr + (derr ** 2)
358     215 continue
359   c
360   c              ... from INTERNAL nodes to OUTPUT nodes
361   c
362         do 220 i = 1, intern
363         do 220 j = 1, iout
364         dd2(j) =(trout(j)-y2(j)) * y2(j) * (1.0 - y2(j))
365   c
366     220 continue
367   c
368         do 221 j = 1, iout
369         del2(j) = del2(j) + dd2(j)
370   c
371     221 continue
372   c
373   c              ... from INPUT nodes to INTERNAL nodes
374   c
375         do 222 i = 1, iin
376         do 222 j = 1, intern
377   c
378         sum = 0.0
379         do 224 k = 1, iout
380         sum = sum + (dd2(k) * w2(j,k))
381   c
382     224 continue
383   c
384         dd1(j) = (1.0 - y1(j)) * y1(j) * sum
385         trindel(i) = trindel(i) + (dd1(j) * w1(i,j))
386   c
387     222 continue
388   c
```

```
389      2000 continue
390   c
391   c              ... get stats
392   c
393          sigerr = sqrt(sigerr / iout)
394   c
395   c              Put the derivatives (Delta-Input) into DZ
396   c              Note DZ  =  DY/(y'-y'^2)/(ymax-ymin)
397   c                    where DY = trindel
398   c
399          do 715 i = 1, iin
400          dz(i) = 0.0
401   c
402          if (ifix(i).eq.1) go to 715
403   c
404          yp = 1.0/(1.0+exp(-z(i)))
405          if ((yp.eq.0).or.(yp.eq.1.0)) go to 715
406          dz(i) = trindel(i)/(conmax(i)-conmin(i))/(yp-yp**2)
407   c
408      715 continue
409   c
410          return
411   c
412          end
413   c
414   c
415   c
416          subroutine fcnj(n, x, y, pd)
417   c
418   c              DUMMY subroutine required for DEGAR
419   c
420          dimension y(n), pd(n, n)
421          return
422   c
423   c
424   c
425          end
426   c
427   c
428   c
```

Input Data File SET.PRM

| | | |
|---|---|---|
| 4 | number of input nodes | Input Concentrations |
| 3 | number of output nodes | Output Color Coordinates |
| 8 | number of hidden nodes | |
| 0.00001 | toler   error tolerance | |
| 100000 | nmax   maximum number of iterations | |
| 1 | nram   number of random trials for best starting point | |

Input Data File CONSTRAINTS.DAT

| | | |
|---|---|---|
| 0.236 | 0.236 | Lower and Upper Limits on Scaled Inputs |
| 0.01 | 0.99 | First and Fourth Inputs Held Fixed |
| 0.01 | 0.99 | |
| 0.228 | 0.228 | |

Input Data File OUTPUT.DAT

| Scaled Color | True Color |
|---|---|
| 0.2865 | 23.79 |
| 0.4346 | 23.52 |
| 0.2983 | -28.38 |

Input Data File TRAIN.W

```
16.540544339,   -1.870946708283,  -4.003102806669,  -2.359546464466      W1
 1.828142583032, -3.809946301014,  -7.488950997386,   2.544604962129
 5.057200624128,  1.494071630005,  -3.747857669302, -10.30815416658
-4.525541703208, -0.7740885039358,  1.023879210147,   4.694808568167
-0.2086929605866, 1.278551554309, -0.4292524148417,  1.528775421437
 3.298019903699,  9.5053170563999E-2, -0.5039911987603, -3.089999474583
-9.896761343055,  2.724255265231,   1.268529486137,   1.410268740404
 1.460822822647, -0.3137031845925, -0.3972428859677, -1.050304506662
41.33483651702,  18.53756131623,   47.08543710594,   -4.438287883885,    W2
 -3.0474669016,  -8.473697224979, -11.83122047895,    8.720720963135
70.22287863714,  69.63473204254, -101.1978832932,    -6.139628970639,
-19.91711544661,-21.77683839173,   0.3007478415264,  25.59485267846
-129.3915807144, 47.50020007255,  58.02704131461,    5.771568793192,
 33.48581215946, 16.59618311604,  -3.912789104846, -16.18134359337
 6.104267799601, -5.039944794379, -6.642741901414,   0.2430068592952,    T1
  1.977633083502,-0.3685688326172, -3.633886914749, -0.1229950286243
-37.0161631459, -51.16528000029,  94.93449081616                         T2
```

Sample Run

```
ESVX22$ run set

NEQ =             4
The best starting values have SIGERR =   0.2989498

Initial  Inputs
        1  0.2360000       Fixed
        2  0.4366403       Randomly  Generated
        3  0.9858826       Randomly  Generated
        4  0.2280000       Fixed RMS Error
   0.0491         1.00          0.10
   0.0420         2.00          0.13
   0.0386         4.00          0.39
   0.0324         8.00          1.28
   0.0222        16.00          2.33
   0.0095        32.00          3.70
   0.0015        64.00          5.14
   0.0003       128.00         12.38
   0.0003       256.00         27.06
   0.0003       512.00        177.69
   0.0003      1024.00       1776.94
   0.0003      2048.00       1776.94
-- Program SET exited after       2048 iterations --

Output SPECIFIED Output ACHIEVED
       1  0.2865000       0.2867626
       2  0.4346000       0.4343085         RMS Error 0.0003
       3  0.2983000       0.2980538

SET-POINT: Input Vector
       Scaled  Values        Rescaled Values       True  Values
       1  0.2360000              0.170              0.170
       2  0.2290054              0.161              0.170
       3  0.5123102              0.515              0.500
       4  0.2280000              0.160              0.160

FORTRAN STOP
```

What is claimed:

1. A control system for both batch initialization and for on-going control of a physical process, the process being of the type in which inputs having physical parameters P are used to produce a product having physical characteristics C associated therewith, the control system comprising:

a parallel distributed processing network previously trained to simulate the process, the parallel distributed processing network being responsive to input activations A to produce outputs Y, the activations being representative of the input parameters P of the process and the outputs being representative of the characteristics C of the product of the process;

means for producing a set of goal signals G corresponding to the desired physical characteristics D of the product of the process;

means for generating a signal representative of the error E between the goal signals G and the outputs Y of the network;

means for determining the values of the updated inputs $A^U$ of the parallel distributed processing network that are needed to drive the error E to a predetermined minimum, and means for changing the actual physical input parameters P of the process to correspond to the updated inputs values $A_U$ producing the minimum error.

2. A method of both batch initialization and on-going control of a physical process using a parallel distributed processing network previously trained to stimulate the process, the process being of the type in which inputs have predetermined physical parameters P produce a product having corresponding physical characteristics C, the method comprising the steps of:

(a) producing a set of goal signals G corresponding to the desired physical characteristics D of the product of the process (b) determining the error E between the goal signals G and the outputs Y of the network (c) determining the values of the updated inputs $A_U$ of the parallel distributed processing network that are needed to drive the error E to a predetermined minimum, and thereafter (d) changing the actual physical parameters P of the process to correspond to the updated inputs values $A_U$ producing the minimum error.

* * * * *